Patented Dec. 12, 1939

2,183,405

UNITED STATES PATENT OFFICE 2,183,405

TREATMENT OF ORGANIC COMPOUNDS

John F. Olin, Grosse Ile, Mich., assignor to The Sharples Solvents Corporation, a corporation of Delaware No Drawing. Application June 13, 1938, Serial No. 213,517

7 Claims. (Cl. 260—674)

This invention relates to a process of purifying hydrocarbons by hydrogenation and specifically contemplates the treatment of hydrocarbon materials with an alcohol and an alkali or alkaline earth metal to destroy color imparting bodies in the hydrocarbon.

The problem of producing hydrocarbons of good color in commercial quantities has long been of major importance to producers of organic chemicals and a large number of processes have been devised to remove or destroy the color imparting bodies present in most crude organic compounds. Filtrations through clays or bone chars have met with considerable success in a large number of cases but such methods are generally accompanied by considerable losses of product by adsorption on the filtering medium and the usual practice of regeneration of clays by burning out organic deposits involves destruction of adsorbed material.

Other methods of decolorizing are costly and no known method is of universal applicability.

It has now been found that the color imparting bodies present in crude hydrocarbons may be converted to substances of little or no color by treatment of the hydrocarbon mass with hydrogen in an active state. The hydrogen may be nascent gas obtained as by the reaction of sodium metal on an alcohol in the reaction chamber, or results of a similar nature, though in some cases less effective, may be obtained by a mild catalytic hydrogenation.

The process of this invention has been found to be particularly useful in the preparation of aromatic compounds, particularly substituted aromatic compounds, as amyl naphthalene for use as plasticizers. This use requires a preparation meeting rather rigid specifications especially with respect to color. This specific situation is exemplary of the decolorizing problems generally met in processes of preparing hydrocarbon compounds for commercial use.

In the large scale production of amyl naphthalene, the product is purified by vaporization in an iron still and rectification in an iron column. The fresh distillate is yellow in color, but upon ageing it assumes a color ranging from yellow red to ruby red. Such deterioration of color is a major defect in a material intended for plasticizing and must be avoided to obtain a product of adequate commercial utility. Attempts to decolorize and stabilize the compound by activated earths result in fairly good improvement of color; a series of five successive treatments with 3% by weight of highly activated contact clay giving a composition of very pale yellow color. However, the amount of clay used and the expense connected with the required manipulations renders this process commercially impractical.

Percolation methods, involving passage of the amyl naphthalene through a mass of relatively large particles of activated clay have been found to be moderately effective in improving color; but the clay rapidly becomes exhausted and must be replaced. Here again, the cost of activated clay and the handling required are not within the bounds set by the price the product will demand in a competitive market. A further drawback is that none of the adsorption methods gives a material of better appearance than a straw color.

Oxidizing agents, such as sodium peroxide with acetic acid, chromic acid and potassium permanganate have also been tried and rejected as unsuitable.

It has now been found that the disadvantages of prior processes can be overcome and marked color improvement of discolored hydrocarbons may be obtained by mild hydrogenation of the crude material. There is some doubt as to the nature of the color imparting bodies which are destroyed or converted to colorless reaction products by the process of this invention. From the nature of the various crude products that have been decolorized by this method, it would appear that the objectionable bodies are heterocyclic compounds, thereby ruling out sulfur derivatives as the source of the trouble, since simple sulfur containing heterocyclic bodies are usually not characterized by color. It would appear to be more likely that the color in a major proportion of cases is due to phenolic substances which are oxidized to colored products upon exposure to air. Such behaviour has been recognized in the case of polyhydric phenolic derivatives and is particularly prominent in connection with pyrogallol.

These theoretical concepts are based on observations made during use of the process of the present invention, and it is to be understood that the invention is not limited to any definite chemical reaction or to the destruction or conversion of particular colored bodies since the complete results in connection with each composition found to be decolorized by hydrogenation have not been satisfactorily explained on the basis of the above theory.

In general the concept of the present invention is adapted to the improvement of the color characteristics of hydrocarbon derivatives. Thus a light mineral oil may be improved for medicinal use by contact with nascent hydrogen. As a final step in the refining of white mineral oil, 2200 parts by weight of oil are placed in a three neck, twelve liter flask equipped with a mercury sealed stirring device and a reflux condenser. 350 parts by weight of tertiary amyl alcohol (16% of the weight of the oil) are then added and the mixture stirred with heating until reflux begins. At this point, 90 parts by weight of metallic sodium are added to the flask and the mixture stirred vigorously while maintaining the temperature sufficiently high to produce a fairly large amount of reflux. The amount of sodium added is, in this case, greater than that required to react with all of the alcohol and additional alcohol may be added to give increased improvement when desired. The alcohol is readily regenerated by hydrolysis of the alcoholate and may be distilled of otherwise purified for reuse.

White oil prepared for market by a suitable refining process including the above step is of high quality and may be adapted to the medicinal uses for which such oils are generally employed. Similar results are obtained by hydrogenation of the oil in the presence of a catalyst. For this purpose care should be exercised that the temperature employed is not sufficiently high to crack the hydrocarbon under treatment; and in general conditions of the treatment should be adjusted so that destructive hydrogenation will not occur. That is, the catalyst should not be highly active or alternatively, the temperature should be maintained at a relatively low point. A suitable catalyst is nickel oxide on kieselguhr, but any hydrogenation catalyst may be used if the other factors are varied to avoid too vigorous hydrogenation.

In connection with the purification of most hydrocarbons it is found advisable to generate hydrogen in the reaction mass by treating an alcohol with an alkali or alkaline earth metal, and in such case the invention also contemplates the introduction of reactive metal as amalgam. Because of its relative cheapness and high activity sodium metal is generally preferred as the metallic body and amalgams drawn from electrolytic cells in which sodium chloride is electrolyzed in contact with a mercury cathode are generally suitable. Such alloys are readily available and inexpensive, and dilution of the amalgam with additional mercury provides an easy method of controlling speed of the reaction which releases nascent hydrogen by decomposition of an alcohol.

The hydrogenation may also be controlled by choosing an alcohol of greater or lesser activity. Thus it will be found that in general the hydrogenation proceeds more slowly or at higher temperatures by using an alcohol of higher molecular weight or an alcohol in which the carbinol group is more highly substituted, as will be more fully brought out in connection with additional specific applications of the present process.

The concept of the present invention is found to be particularly useful in purifying aromatic compounds, but care must be exercised to avoid conversion or decomposition of the composition to be purified. It will be at once evident that the metal plus alcohol method is unsuitable for decolorizing materials containing hydroxyl substituted compounds. Similarly, any hydrogenation process must not be so strenuous as to destroy the characteristics of the material under treatment.

The unsubstituted aromatic compounds present a field in which the invention is very useful but it has been found that hydrogenation as a means of decolorizing achieves a position of major importance in preparing alkyl substituted aromatic compounds for market. As is pointed out above, alkyl substituted aromatic compounds, as amyl naphthalene, intended to be employed as plasticizing agents must meet rather rigid specifications for use in high grade resinous products. Processes of decolorization of alkyl substituted aromatics in general by hydrogenation and particularly amyl naphthalene by treatment with an alcohol and sodium have been found to be very satisfactory.

The following specific example illustrates the generally excellent results obtained by hydrogenation of alkyl substituted aromatic compounds of poor color.

8000 cc. of off-color crude diamyl naphthalene were placed in a twelve liter, three-necked flask operatively connected to a reflux condenser and having a mercury sealed stirring device extending into the body of the vessel. 560 grams of tertiary amyl alcohol were then added to the flask and heat applied to bring the mixture to about 140° C. 160 grams of sodium metal were then added in pieces of small size and the reaction mass maintained at 140° to 180° C. with stirring until all the sodium had dissolved. After cooling the mixture in the flask, water was cautiously added and the mass allowed to remain quiet until it was stratified into two definite layers. The aqueous layer was a brown liquid, while the oil layer was colored to a somewhat less degree than the water. The oil was then decanted and washed with several portions of water until the wash water was found to be colorless. The purified diamyl naphthalene was then distilled under vacuum and found to be perfectly water white and of unusually high quality for this type of commercial plasticizer.

Further research has indicated that in general the higher alcohols give better results than their lower, more reactive homologues and that tertiary alcohols are more effective than secondary alcohols, which are in turn more effective than primary alcohols in decolorizing alkyl substituted aromatic bodies. The most logical explanation of this phenomenon that has been formulated is that certain values of temperature and concentration of nascent hydrogen give best results in the decolorization of a given crude commercial hydrocarbon. It is probable that these factors are suitably adjusted to decolorization of crude amyl naphthalene of the type recited above when a mixture of sodium and tertiary amyl alcohol is brought to the temperature at which substantial reaction is initiated.

While it is to be understood that the present invention is not to be considered as limited by theoretical concepts, it has been found that, in general, determination of an alcohol to be used in the hydrogenation of a given hydrocarbon to decolorize the same can be readily made by a relatively few tests in connection with alcohols of varying molecular weight and degree of substitution. Preferably the temperature employed will be that at which substantial amounts of hydrogen are released from the mixture of alkali or alkaline earth metal and alcohol. Bearing in mind that the reactivity of an alcohol decreases with increase in molecular weight and also with degree of substitution on the carbon atom of the carbinol group, an alcohol suitable for the decolorization of a given hydrocarbon will be readily determined by those skilled in the art by following the teachings of this invention. Further modification of the invention includes the use of metals of varying activity whereby an increase in temperature is rendered necessary and the effect of nascent hydrogen is increased in the manner well understood to accompany elevation of temperature. Thus the invention contemplates the use in conjunction with an alcohol of alkali metals such as sodium, potassium and lithium or alkaline earth metals as calcium, barium, and strontium, that is, the metals of groups I and II of the periodic table capable of replacing hydrogen from an alcohol.

I claim:

1. The process of decolorizing an alkyl substituted aromatic hydrocarbon compound comprising subjecting the said compound to a mild hydrogenation by mixing an aliphatic monohydric alcohol therewith and adding to the mixture a metal capable of replacing hydrogen in said alcohol.

2. The process of decolorizing crude amyl naphthalene comprising subjecting the same to a mild hydrogenation by mixing an aliphatic monohydric alcohol therewith and adding to the mixture a metal capable of replacing hydrogen in said alcohol.

3. The process of decolorizing an alkyl substituted aromatic hydrocarbon compound comprising subjecting the said compound to a mild hydrogenation by mixing an aliphatic monohydric alcohol therewith and adding to the mixture a metal of the class consisting of alkali and alkaline earth metals.

4. The process of decolorizing crude amyl naphthalene comprising subjecting the same to a mild hydrogenation by mixing an aliphatic monohydric alcohol therewith and adding to the mixture a metal of the class consisting of alkali and alkaline earth metals.

5. The process of decolorizing an alkyl substituted aromatic hydrocarbon compound comprising subjecting the said compound to a mild hydrogenation by mixing tertiary amyl alcohol therewith and adding metallic sodium to the mixture.

6. The process of decolorizing crude amyl naphthalene comprising subjecting the same to a mild hydrogenation by mixing tertiary amyl alcohol therewith and adding metallic sodium to the mixture.

7. The process of decolorizing an alkyl substituted aromatic hydrocarbon compound which comprises subjecting the said compound to a mild hydrogenation by mixing an aliphatic monohydric alcohol therewith, adding to the mixture a metal capable of replacing hydrogen in said alcohol, and thereafter washing the resulting material with water.

JOHN F. OLIN.

CERTIFICATE OF CORRECTION.

Patent No. 2,183,405.                      December 12, 1939.

JOHN F. OLIN.

It is hereby certified that error appears in the printed specification of the above numbered patent requiring correction as follows: Page 1, second column, line 11, for "cast" read cost; page 2, first column, line 21, for "of" read or; line 36, for "on" read or; and that the said Letters Patent should be read with this correction therein that the same may conform to the record of the case in the Patent Office.

Signed and sealed this 6th day of February, A. D. 1940.

(Seal)                                                  Henry Van Arsdale,
Acting Commissioner of Patents.